(12) United States Patent
Zhang et al.

(10) Patent No.: US 8,605,286 B2
(45) Date of Patent: Dec. 10, 2013

(54) BIAXIAL OPTICAL GYROSCOPE

(75) Inventors: Tong Zhang, Nanjing (CN); Xiaojun Xue, Nanjing (CN); Xiaoyang Zhang, Nanjing (CN); Pengqin Wu, Nanjing (CN); Qiuyue Chen, Nanjing (CN)

(73) Assignee: Southeast University, Jiangsu (CN)

( * ) Notice: Subject to any disclaimer, the term of this patent is extended or adjusted under 35 U.S.C. 154(b) by 253 days.

(21) Appl. No.: 13/321,147

(22) PCT Filed: Sep. 23, 2009

(86) PCT No.: PCT/CN2009/074162
§ 371 (c)(1),
(2), (4) Date: Nov. 17, 2011

(87) PCT Pub. No.: WO2010/133058
PCT Pub. Date: Nov. 25, 2010

(65) Prior Publication Data
US 2012/0062899 A1  Mar. 15, 2012

(30) Foreign Application Priority Data
May 22, 2009  (CN) .......................... 2009 1 0027185

(51) Int. Cl.
*G01C 19/72* (2006.01)
*G01B 9/02* (2006.01)
*G02B 6/12* (2006.01)
*G02B 6/26* (2006.01)
*G02B 6/42* (2006.01)

(52) U.S. Cl.
USPC ................ 356/460; 356/483; 385/14; 385/45

(58) Field of Classification Search
USPC ........................ 356/459–466, 483; 385/14, 45
See application file for complete search history.

(56) References Cited

U.S. PATENT DOCUMENTS

| | | | |
|---|---|---|---|
| 5,194,917 A | 3/1993 | Regener | |
| 5,355,424 A * | 10/1994 | Idler et al. | 385/14 |
| 5,436,992 A * | 7/1995 | Wang et al. | 385/45 |
| 5,655,035 A | 8/1997 | Burmenko | |
| 7,190,462 B2 * | 3/2007 | Ohno et al. | 356/460 |
| 2009/0015843 A1 | 1/2009 | Demers et al. | |

OTHER PUBLICATIONS

Alexandra Boltasseva, Thomas Nikolajsen, Kristjan Leosson, Kasper Kjaer, Morten S. Larsen, and Sergey I. Bozhevolnyi, "Integrated Optical Components Utilizing Long-Range Surface Plasmon Polaritons", Journal of Lightwave Technology, vol. 23, Issue 1, pp. 413—(2005).*

(Continued)

*Primary Examiner* — Gregory J Toatley
*Assistant Examiner* — Willie Merrell, II
(74) *Attorney, Agent, or Firm* — Christie, Parker & Hale, LLP

(57) ABSTRACT

A biaxial optical gyroscope is provided, which realizes mode separation using the waveguide devices with different material, and the biaxial optical gyroscope includes: a surface Plasmon Polariton Y-type mode splitter (1), a Y waveguide integrated optical device (2), a Y waveguide integrated optical chip (3), a first polarization-maintaining fiber coil (41), a second polarization-maintaining fiber coil (42), directional couplers (51, 52) and detectors (61, 62), wherein the two output ends of the surface Plasmon Polariton Y-type mode splitter (1) are respectively connected to the Y waveguide integrated optical device (2) and the Y waveguide integrated optical chip (3), and the output ends of the Y waveguide integrated optical device (2) and the Y waveguide integrated optical chip (3) are respectively connected to the first polarization-maintaining fiber coil (41) and the second polarization-maintaining fiber coil (42).

4 Claims, 2 Drawing Sheets

(56) References Cited

OTHER PUBLICATIONS

International Search Report, dated Feb. 25, 2010, corresponding to PCT/CN2009/074162, 8 pages.
Zhao, et al., "A Novel Y-Branch Waveguide Based on Surface Plasmon Polaritons," Acta Optica Sinica, Sep. 2007, vol. 27, No. 9, pp. 1649-1652.
Zhao, et al., "Optical Directional Coupler Based on Surface Plasmon Polariton," Science in China (Series G: Physics; Mechanics & Astronomy), Feb. 2009, vol. 39, No. 2, pp. 191-195, with English Abstract.

* cited by examiner

BIAXIAL OPTICAL GYROSCOPE

CROSS-REFERENCE TO RELATED APPLICATION(S)

This application is a National Phase Patent Application and claims the priority to and benefit of International Application Number PCT/CN2009/074162, filed on Sep. 23, 2009, which claims priority of Chinese Patent Application Number 200910027185.4, filed on May 22, 2009.

TECHNICAL FIELD

The present invention pertains to the technical field of integrated optics and inertial sensors, in particular relates to a biaxial optical gyroscope.

BACKGROUND ART

Optical gyroscope is an important test component in inertial navigation, inertial guidance and control-testing equipment. Optical gyroscope is a novel photoelectric gyroscope based on Sagnac effect, and the technical evolution of optical gyroscope is closely related with the development of gyroscope. Since the performance of inertial guidance system largely depends on the performance of gyroscope, the technical level of gyroscope has direct influence on the performance indexes of inertial navigation system and inertial guidance device. Optical gyroscopes that are used in existing applications are mainly designed to implement single-axis measurement, which are single function and usually can't be used for simultaneous multi-axis spatial measurement. Hence, there is a demand for the capability of multi-axis (biaxiall or triaxial) measurement with a single inertial sensor, to support future development of single inertial sensor technique.

In recent years, integrated optical devices that utilize conventional media encounter a bottleneck in miniaturization and integration due to the existence of diffraction limit; while Surface Plasmon Wave can restrain the energy strictly at the interface between the metal material and the medium, so that the surface Plasmon Polariton waveguide can achieve long-distance signal transmission and maintaining the signals in mono-polarization state, and can also implement optical/electrical multiplexing in the same optical circuit.

SUMMARY OF THE INVENTION

Technical Problem

The present invention provides a biaxial optical gyroscope, which is a biaxial photometric gyroscope that utilizes waveguide devices made of different materials for mode separation, and has advantages such as higher utilization ratio of optical source and higher integration level, etc.

Technical Scheme

The biaxial optical gyroscope provided in the present invention includes a surface Plasmon Polariton Y-type mode splitter, a Y waveguide integrated optical device, a Y waveguide integrated optical chip, a first polarization-maintaining fiber coil, a second polarization-maintaining fiber coil, a first directional coupler, a second directional coupler, a first detector and a second detector, arranged in the following positional relationship: the two output ends of the surface Plasmon Polariton Y-type mode splitter are connected with the Y waveguide integrated optical device and the Y waveguide integrated optical chip respectively, the output ends of the Y waveguide integrated optical device and the Y waveguide integrated optical chip are connected with the first polarization-maintaining fiber coil and the second polarization-maintaining fiber coil respectively, a first modulation electrode, a second modulation electrode, a first metal wire gap and a second metal wire gap are produced on the output end of an upper branch waveguide of the Y waveguide integrated optical chip.

The surface Plasmon Polariton Y-type mode splitter is consisted of a polymer core layer and polymer claddings, with the arms coated with a metal film in thickness of 10-20 nanometers and in width of 1-3 micrometers; both the width and the thickness of the polymer core layer are several micron dimension.

The Y waveguide integrated optical device is made of $LiNbO_3$ crystal material. The Y integrated optical chip is produced from surface Plasmon Polariton waveguide, wherein, the surface Plasmon Polariton waveguide is consisted of a metal core layer, an upper cladding, a lower cladding, and a substrate; the metal core layer is nanometer metal wires in thickness of 10-20 nanometers and in width of 4-8 micrometers, both the upper cladding and the lower cladding are made of organic polymer dielectric material, and in thickness of 10-20 micrometers.

The optical circuit of the biaxial optical gyroscope provided in the present invention is as follows: an optical beam from an optical source enters into the surface Plasmon Polariton Y-type mode splitter, and is separated into optical signal in TE mode and optical signal in TM mode. The output optical signal in TE mode enters into the Y waveguide integrated optical device via the directional coupler and is split into two optical beams, wherein, one optical beam is phase-modulated by a phase modulator, and both optical beams enter into the polarization-maintaining fiber coil; the output optical signal in TM mode enters into the Y waveguide integrated optical chip via the directional coupler and is split into two optical beams, wherein, one beam is phase-modulated by a phase modulator, and both optical beams enter into the polarization-maintaining fiber coil. The optical signals that enter into the polarization-maintaining fiber coil propagate in clockwise direction and counter clockwise direction, and then return along their respective optical paths, through the directional coupler and then enter into the detector.

Beneficial Effects

Compared to the prior art, the present invention has the following advantages:

1. Compared to conventional single inertia optical gyroscope for single-axis measurement, the biaxial optical gyroscope provided in the present invention can implement biaxial measurement with a single inertia optical gyroscope, due to its unique mode separation structure.
2. The biaxial optical gyroscope provided in the present invention employs different materials for signal transmission in different modes, wherein, polarization maintaining is implemented during optical signal transmission with the surface Plasmon Polariton waveguide material.
3. Compared to conventional single inertia optical gyroscope, the biaxial optical gyroscope provided in the present invention implements the application of measurement of optical signals in TE mode and optical signals in TM mode in different axial directions, and thereby improves the utilization ratio of optical source.

4. Based on surface Plasmon Polariton principle, the biaxial optical gyroscope provided in the present invention can implement optical/electrical multiplexing in the same optical circuit.

EMBODIMENT

Figure 1:
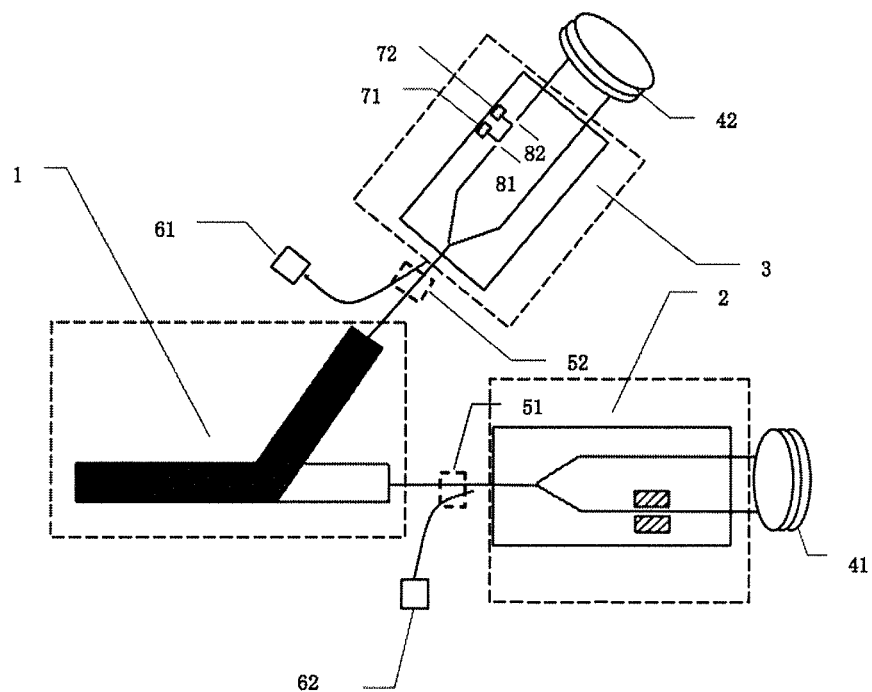
FIG. 1 is the structural representation of the biaxial optical gyroscope.
Figure 2:
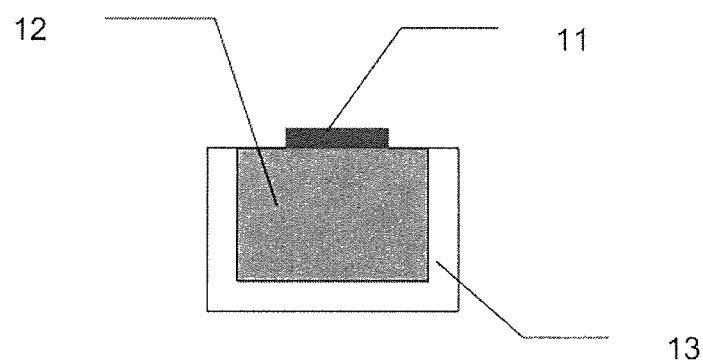
FIG. 2 is the sectional view of surface Plasmon Polariton Y-type mode splitter of the biaxial optical gyroscope.
Figure 3:
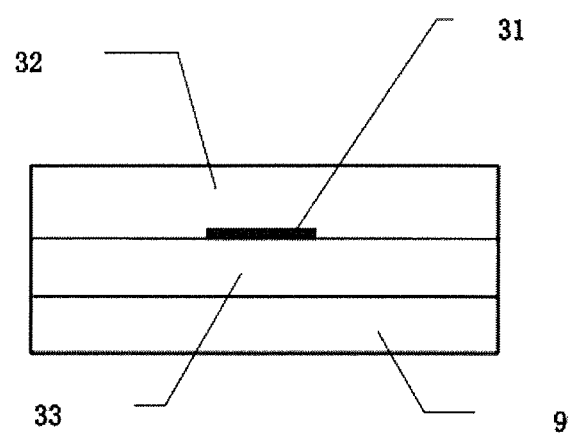
FIG. 3 is the sectional view of the surface Plasmon Polariton waveguide of the biaxial optical gyroscope.

Hereunder the technical scheme of the present invention will be further detailed, with reference to the accompanying drawings.

Viewed structurally, the biaxiall optical gyroscope provided in the present invention comprises a surface Plasmon Polariton Y-type mode splitter 1, a Y waveguide integrated optical device 2, a Y waveguide integrated optical chip 3, a first polarization-maintaining fiber coil 41, a second polarization-maintaining fiber coil 42, directional couplers 51 and 52, and detectors 61 and 62; the positional relationship of the components is: the two output ends of the surface Plasmon Polariton Y-type mode splitter 1 are connected with the Y waveguide integrated optical device 2 and the Y waveguide integrated optical chip 3, the output ends of the Y waveguide integrated optical device 2 and the Y waveguide integrated optical chip 3 are connected with the first polarization-maintaining fiber coil 41 and the second polarization-maintaining fiber coil 42, a first modulation electrode 71, a second modulation electrode 72, a first metal wire gap 81, and a second metal wire gap 82 are produced on the output end of an upper branch waveguide of the Y waveguide integrated optical chip 3.

It can be seen from the Maxwell's Equations and boundary conditions: only transverse magnetic (TM) mode can propagate perpendicularly to the interface between the metal material and the medium and produce surface Plasmon Polariton by coupling and excitation, while transverse electric (TE) mode can't produce coupling and excitation phenomenon. The biaxial optical gyroscope provided in the present invention employs the surface Plasmon Polariton waveguide material to implement mode separation and biaxial measurement, based on the surface Plasmon Polariton principle.

The working principle of the biaxial optical gyroscope provided in the present invention is as follows:

An optical beam from an optical source enters into a surface Plasmon Polariton Y-type mode splitter, and is separated into optical signal in TE mode and optical signal in TM mode, wherein, the optical signal in TE mode is outputted from the straight-through arm of the surface Plasmon Polariton Y-type mode splitter, while the optical signal in TM mode is outputted from the other arm that has a metal film structure in the surface Plasmon Polariton Y-type mode splitter. The output optical signal in TE mode enters into a Y waveguide integrated optical device via a coupler and is split into two interchangeable optical beams, wherein, one optical beam is phase-modulated by a phase modulator, and both optical beams are outputted and coupled by output waveguides into a polarization-maintaining fiber coil; alternatively, the polarization-maintaining fiber coil can be substituted with depolarizing technique and a common fiber coil, to reduce the cost; the output optical signal in TM mode enters into a Y waveguide integrated optical chip via a coupler and is split into two interchangeable optical beams, wherein, one beam is phase-modulated by a phase modulator, and both optical beams are outputted and coupled by output waveguides into a polarization-maintaining fiber coil; similarly, the polarization-maintaining fiber coil can be substituted with depolarizing technique and a common fiber coil, to reduce the cost. The optical signals that enter into the polarization-maintaining fiber coil propagate in clockwise direction and counter clockwise direction, and then return along their respective optical paths, and are coupled in the coupler and then enter into the detector; finally, the angular velocity can be obtained by detecting the output phase difference between the polarization-maintaining fiber coils in the detector.

The invention claimed is:

1. A biaxial optical gyroscope, characterized in that the optical gyroscope including a surface Plasmon Polariton Y-type mode splitter (1), a Y waveguide integrated optical device (2), a Y waveguide integrated optical chip (3), a first polarization-maintaining fiber coil (41), a second polarization-maintaining fiber coil (42), a first directional coupler (51), a second directional coupler (52), a first detector (61), and a second detector (62), wherein, the components are arranged in the following positional relationship: the two output ends of the surface Plasmon Polariton Y-type mode splitter (1) are connected with the Y waveguide integrated optical device (2) and the Y waveguide integrated optical chip (3) respectively, the output ends of the Y waveguide integrated optical device (2) and the Y waveguide integrated optical chip (3) are connected with the first polarization-maintaining fiber coil (41) and the second polarization-maintaining fiber coil (42) respectively; a first modulation electrode (71), a second modulation electrode (72), a first metal wire gap (81), and a second metal wire gap (82) are produced on the output end of an upper branch waveguide of the Y waveguide integrated optical chip (3).

2. The biaxial optical gyroscope according to claim 1, wherein the surface Plasmon Polariton Y-type mode splitter (1) is comprised of a polymer core layer (12) and polymer claddings (13), with the arms coated with a metal film (11) in thickness of 10-20 nanometers and in width of 1-3 micrometers; both the width and thickness of the polymer core layer (12) are several micron dimension.

3. The biaxial optical gyroscope according to claim 1, wherein the Y waveguide integrated optical device (2) is made of $LiNbO_3$ crystal material.

4. The biaxial optical gyroscope according to claim 1, wherein the Y waveguide integrated optical chip (3) is produced from surface Plasmon Polariton waveguides, wherein, the surface Plasmon Polariton waveguides comprise a metal core layer (31), an upper cladding (32), a lower cladding (33), and a substrate (9), wherein, the metal core layer (31) is a nanometer metal wire in thickness of 10-20 nanometers and in width of 4-8 micrometers, both the upper cladding (32) and the lower cladding (33) are made of an organic polymer dielectric material, and are in thickness of 10-20 micrometers respectively.

* * * * *